United States Patent [19]

Kanamori

[11] Patent Number: 5,124,917
[45] Date of Patent: Jun. 23, 1992

[54] VEHICLE BODY VIBRATION CONTROL APPARATUS

[75] Inventor: Nobuaki Kanamori, Susono, Japan

[73] Assignee: Toyota Jidosha Kabushiki Kaisha, Toyota, Japan

[21] Appl. No.: 519,438

[22] Filed: May 4, 1990

[30] Foreign Application Priority Data

May 12, 1989 [JP] Japan ................. 1-119595

[51] Int. Cl.⁵ ............................................. B60G 17/00
[52] U.S. Cl. ......................... 364/424.05; 280/703; 280/707
[58] Field of Search ............... 364/424.05; 280/707, 280/840, 703, DIG. 1

[56] References Cited

U.S. PATENT DOCUMENTS

| | | | |
|---|---|---|---|
| 4,647,068 | 3/1987 | Asami et al. | 280/707 |
| 4,714,272 | 12/1987 | Buma et al. | 280/707 |
| 4,725,072 | 2/1988 | Asami et al. | 280/707 |
| 4,744,589 | 5/1988 | Buma et al. | 280/707 |
| 4,756,549 | 7/1988 | Kurosawa et al. | 280/707 |
| 4,872,701 | 10/1989 | Akatsu et al. | 280/703 |
| 4,970,645 | 11/1990 | Adachi et al. | 364/424.05 |
| 5,013,067 | 5/1991 | Mine et al. | 280/840 |
| 5,053,965 | 10/1991 | Fujimura et al. | 364/424.05 |

Primary Examiner—Gary Chin
Attorney, Agent, or Firm—Oblon, Spivak, McClelland, Maier & Neustadt

[57] ABSTRACT

A vehicle body vibration control apparatus separately controls a first vehicle height vibration mechanism provided on a front-wheel side and a second vehicle height vibration mechanism provided on a rear-wheel side. The first and second mechanisms provide first and second damping forces. When it is separately determined that the first and second damping forces should be increased, the first and second damping force are increased by a controller after first and second delay times elapse, respectively. The first and second delay times are selected in accordance with a current vehicle speed so that a front-wheel-side vehicle height vibration and a rear-wheel-side vehicle height vibration are converged toward a mean vehicle height from an identical converging direction and are suppressed to the mean vehicle height at almost the same time.

20 Claims, 8 Drawing Sheets

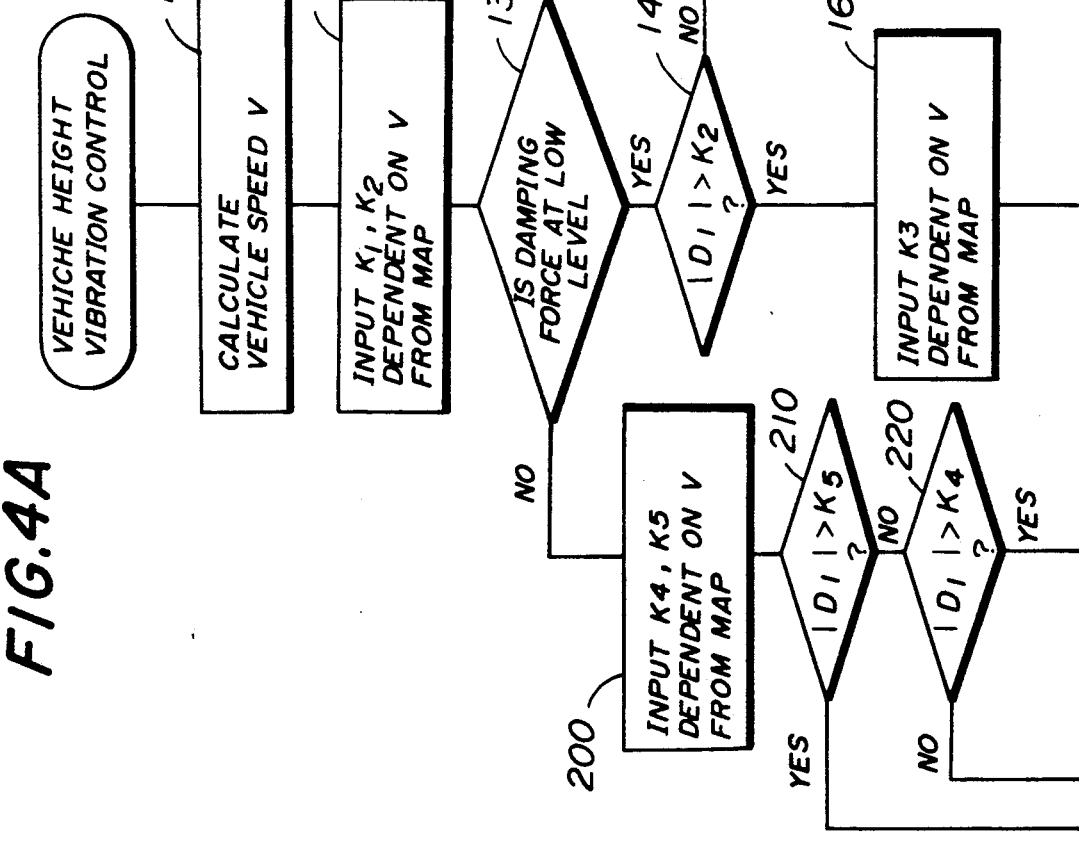

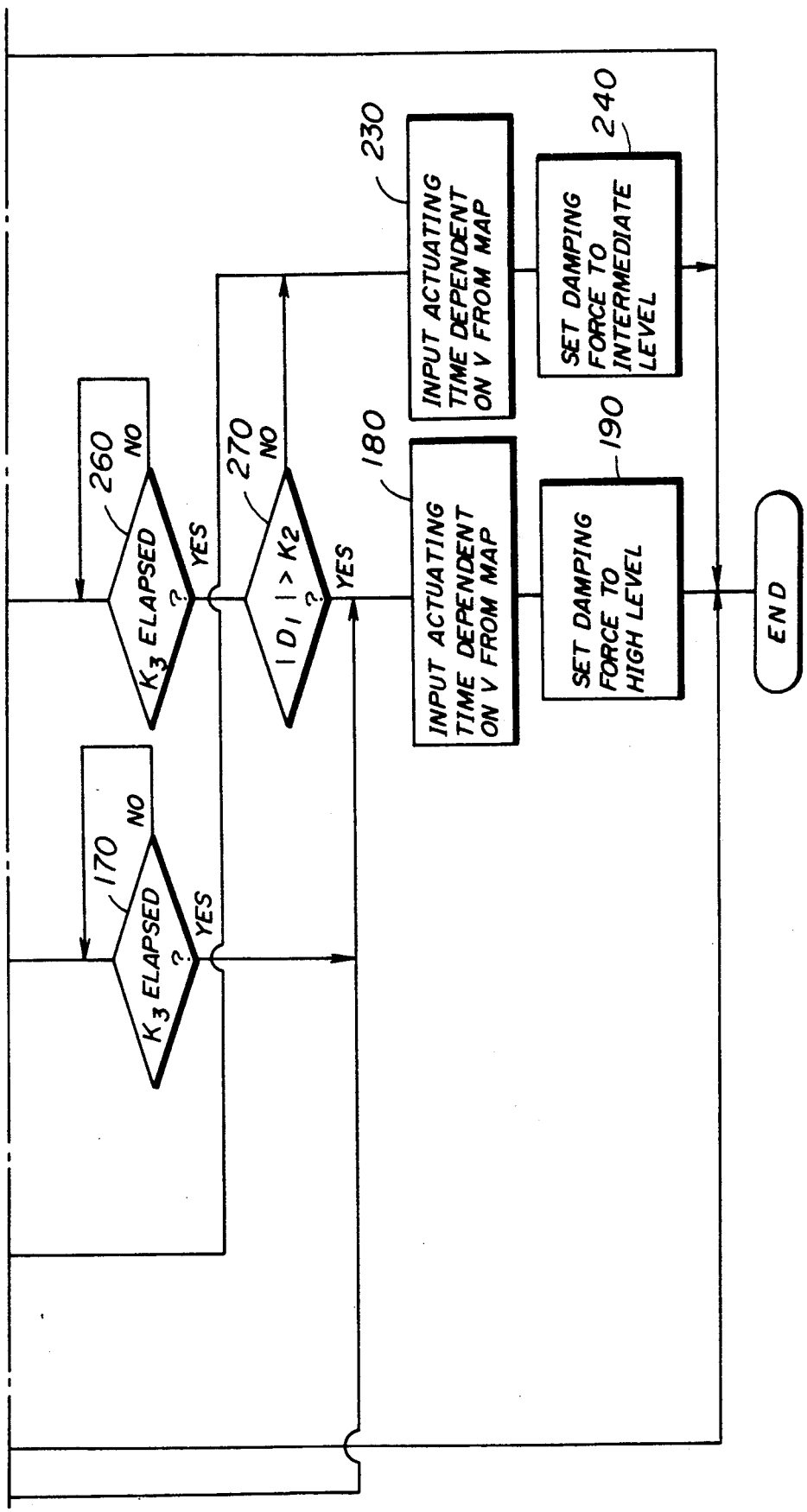

FIG. 6

| | VEHICLE SPEED V km/h | FIRST TIME | | | | CONTINUTION | | |
|---|---|---|---|---|---|---|---|---|
| | | K1 mm | K2 mm | K3 ms ACTUATING TIME ms | ACTUATING TIME ms | K4 mm | K5 mm | ACTUATING TIME ms |
| FRONT WHEELS | ~39 | a1 | b1 | c1 | d1 | e1 | f1 | g1 |
| | 40~99 | a2 | b2 | c2 | d2 | e2 | f2 | g2 |
| | 100~ | a3 | b3 | c3 | d3 | e3 | f3 | g3 |
| REAR WHEELS | ~39 | a4 | b4 | c4 | d4 | e4 | f4 | g4 |
| | 40~99 | a5 | b5 | c5 | d5 | e5 | f5 | g5 |
| | 100~ | a6 | b6 | c6 | d6 | e6 | f6 | g6 |

VEHICLE BODY VIBRATION CONTROL APPARATUS

BACKGROUND OF THE INVENTION (1) Field of the Invention

The present invention generally relates to a vehicle body vibration control apparatus, and more particularly to a vehicle body vibration control apparatus for decreasing a pitching vibration of a vehicle body due to a rough surface of a road.

(2) Description of the Prior Art

Conventionally, there is known an apparatus for controlling the damping force of a shock absorber provided between a vehicle body and each wheel so that a vibration of a vehicle body due to a rough road surface is suppressed in an early stage of the vehicle body vibration (see Japanese Laid-Open Patent Application No. 62-166104). The proposed apparatus is directed to improving ride comfort and suppressing the vehicle body vibration in an early stage thereof. For these purposes, the damping force of each of the shock absorbers is altered to increase after the elapse of a predetermined delay time That is, the damping force is not changed to increase immediately after a vehicle body vibration takes place The predetermined delay time is set equal to or less than half of the first one-cycle of the vehicle body vibration.

It will be noted that there is a possibility that the phase of the vehicle body vibration on the front-wheel side is different from that on the rear-wheel side due to the relationship between a vehicle speed and a wheel base In some cases, the phase of the vehicle body vibration on the front-wheel side is approximately 180° out of phase with that on the rear-wheel side. In such cases, the vehicle body does not have a simple bouncing vibration (a vertical movement of the entire vehicle body) but a pitching vibration. Pitching vibrations of the vehicle body give a person in the vehicle body a much more uncomfortable ride than given by bouncing vibrations.

The apparatus disclosed in the aforementioned Japanese application is capable of definitely suppressing the vehicle body vibration in an early stage thereof when the vibration is a bouncing vibration. However, the apparatus cannot effectively eliminate problems arising from a pitching vibration which causes the phase difference between the front-wheel-side vibration and the rear-wheel-side vibration.

There is also known an apparatus in which the damping force of each shock absorber and the spring constant of each suspension on the front-wheel side is controlled independently of those on the rear-wheel side so that natural vibrations of the vehicle body having different frequencies on the front and rear-wheel sides can be appropriately suppressed (see Japanese Laid-Open Utility Model Application No. 63-4808). However, this apparatus controls the damping force irrespective of the phase difference between the front-wheel-side vibration and the rear-wheel-side vibration. Thus, it is impossible to effectively suppress a pitching vibration any time it occurs until the vehicle body vibration is completely suppressed.

As has been described above, the conventional vehicle body vibration control apparatuses do not have any means for handling pitching vibrations. Thus, there is room for further improvements in a vehicle body vibration control apparatus which will lead to greater ride comfort.

SUMMARY OF THE INVENTION

It is a general object of the present invention to provide an improved vehicle body vibration control apparatus in which the aforementioned disadvantages are eliminated.

A more specific object of the present invention is to provide a vehicle body vibration control apparatus capable of effectively suppressing not only bouncing vibrations but also pitching vibrations in an early stage thereof.

The above-mentioned objects of the present invention are achieved by a vehicle body vibration control apparatus for controlling a first mechanism for suppressing a front-wheel-side vehicle height vibration on a front-wheel side of a vehicle by a first damping force and a second mechanism for suppressing a rear-wheel-side vehicle height vibration on a rear-wheel side thereof by a second damping force, the vehicle body vibration control apparatus comprising vehicle height detecting means for detecting a first vehicle height on the front-wheel side and a second vehicle height on the rear-wheel side; and vehicle speed measuring means for measuring a vehicle speed of the vehicle. The vehicle body vibration control apparatus also includes damping force control means, coupled to the first and second mechanisms and the vehicle height detecting means, for controlling the first damping force so that the first damping force is increased after a first delay time elapses from a time when the first vehicle height exceeds a first predetermined vehicle height range and for controlling the second damping force so that the second damping force is increased after a second delay time elapses from a time when the second vehicle height exceeds a second predetermined vehicle height range. Further, the vehicle body vibration control apparatus comprises delay time setting means, coupled to the vehicle speed measuring means and the damping force control means, for setting the first and second delay times which vary depending on the vehicle speed, in the damping force control means, so that the front-wheel-side vehicle height vibration and the rear-wheel-side vehicle height vibration are converged toward a mean vehicle height from an identical converging direction and are suppressed to the mean vehicle height at almost the same time.

BRIEF DESCRIPTION OF THE DRAWINGS

The other objects, features and advantages of the present invention will become apparent from the following detailed description when read in conjunction with the accompanying drawings, in which:

FIG. 4 is a diagram illustrating how to combine FIGS. 3A and 3B;

FIGS. 4A and 4B are flowcharts of a vehicle body vibration control process executed by the preferred embodiment of the present invention shown in FIG. 2;

FIG. 6 is a diagram of a map used for setting various parameters; and

DESCRIPTION OF THE PREFERRED EMBODIMENTS

Figure 1:
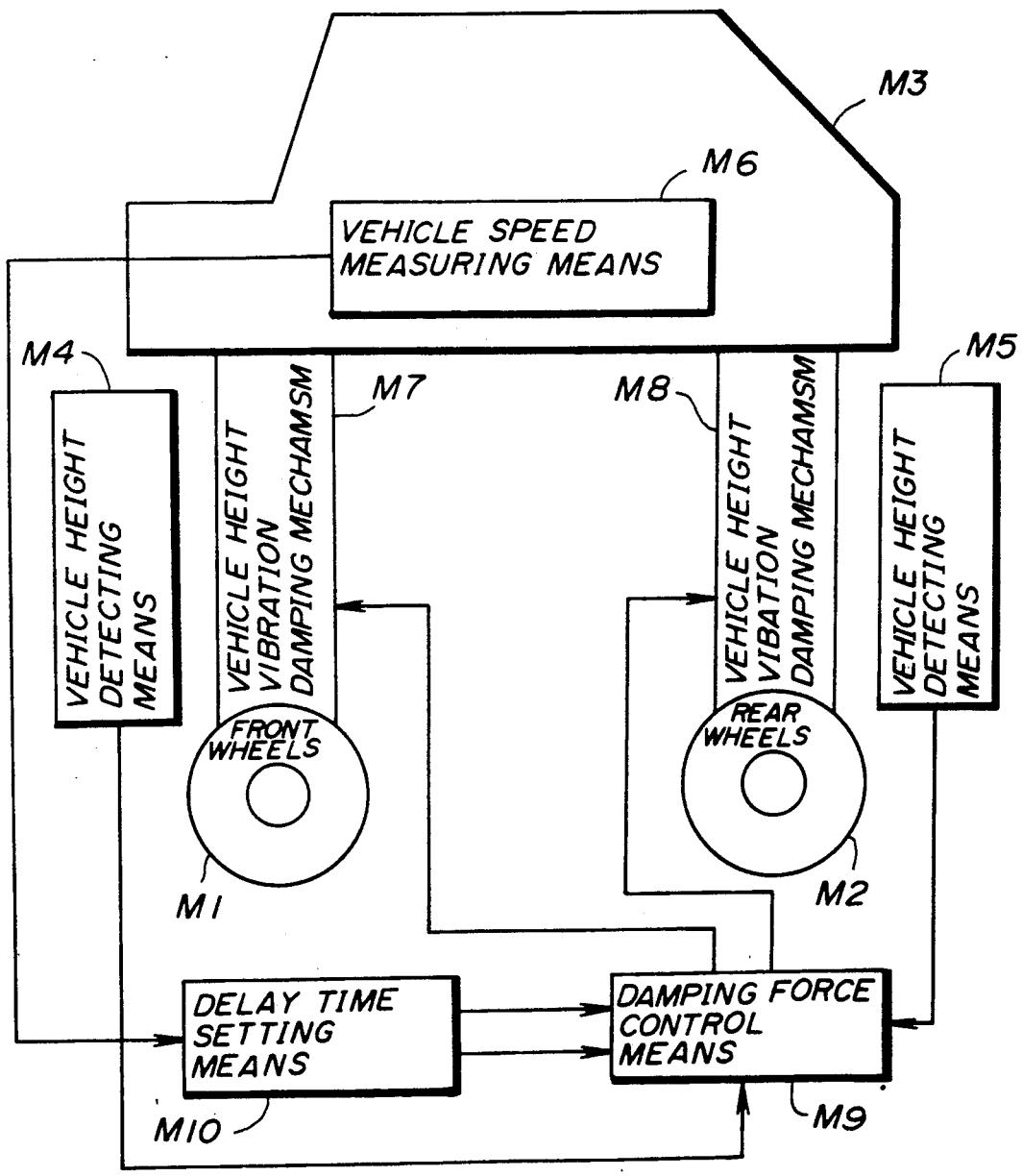
FIG. 1 is a block diagram of a general structure of a vehicle body vibration control apparatus according to the present invention.

A description will now be given of the principle of the present invention with reference to FIG. 1. The vehicle body vibration control apparatus is composed of two vehicle height detecting means M4 and M5, a vehicle speed measuring means M6, two vehicle height (body) vibration damping mechanisms M7 and M8, a damping force control means M9 and a delay time setting means M10. The vehicle height detecting means M4 is provided on the side of two front wheels M1, and detects the relative distance between the front wheels M1 and a vehicle body M3, which is handled as a vehicle height. The vehicle height detecting means M5 is provided on the side of two rear wheels M2, and detects the relative distance between the rear wheels M2 and the vehicle body M3, which is handled as a vehicle height. The speed measuring means M6 measures the speed of the vehicle. The vehicle height vibration damping mechanism M7 is provided between the front wheels M1 and the vehicle body M3 and suppresses the vibration of the vehicle body M3. A damping force provided by the vehicle height vibration damping mechanism M7 is controlled by the damping force control means M9. The vehicle height vibration damping mechanism M8 is provided between the rear wheels M2 and the vehicle body M3 and suppresses the vibration of the vehicle body M3. A damping force provided by the vehicle height vibration damping means M8 is controlled by the damping force control means M9. The delay time setting means M10 provides a first delay time related to the vehicle height vibration damping mechanism M7 and a second delay time related to the vehicle height vibration damping mechanism M8. The first and second delay times are variable depending on the vehicle speed measured by the vehicle speed measuring means M6. The damping force control means M9 controls the vehicle height vibration damping mechanism M7 so that the damping force provided thereby is altered to an increased value when the first delay time elapses from the time when the vehicle height detecting means M4 detects that the vehicle height has become greater than a predetermined first vehicle height. The damping force control means M9 controls the vehicle height vibration damping mechanism M8 so that the damping force provided thereby is changed to an increased value when the second delay time elapses from the time when the vehicle height detecting means M5 detects that the vehicle height has become greater than a predetermined second vehicle height.

The first and second delay times, which are varied depending on the vehicle speed, are provided for separately altering the damping forces of the vehicle height vibration damping mechanisms M7 and M8. In other words, the vehicle height vibration damping mechanisms M7 and M8 are separately controlled in accordance with the vehicle speed. This separate control has been provided due to the following knowledge obtained by the inventor.

First, the vehicle height (body) vibrations appearing on the front-wheel side and the rear-wheel side must be suppressed to zero at almost the same time. Second, the vehicle height vibration must be converged toward a mean vehicle height from the same direction (increasing or decreasing direction) on the front-wheel side and the rear-wheel side, and must become zero at the mean vehicle height. When at least the above two conditions are satisfied, a person in the vehicle body will feel that the vibration of the vehicle body M3 is not a pitching vibration but instead a bouncing vibration so that ride comfort will be improved.

When a vehicle height vibration occurs due to a rough road surface, there is a difference in vibration occurrence time between the front-wheel side and the rear-wheel side due to the presence of the wheel base. Thus, vehicle height vibrations on the front-wheel and rear-wheel sides may not be ended at the same time and not be converged toward the mean vehicle height from the same direction, if the damping forces provided by the vehicle height vibration damping mechanisms M7 and M8 are separately changed to an increased value when the vehicle height detecting means M4 and M5 respectively detect vehicle height vibrations which are to be suppressed. Further, there is a possibility that the resonant frequency of the vehicle height vibration on the front-wheel side will not be equal to that on the rear-wheel side. From this point of view, the converging direction of the vehicle height toward the mean vehicle height on the front-wheel side is not the same as that on the rear-wheel side even if the vehicle height vibrations can become zero at the same time on the front-wheel and rear-wheel sides.

According to the present invention, the two delay times (first and second delay times) are separately provided for the front wheels M1 and the real wheels M2 and changed depending on the vehicle speed, and the relationship between the first and second delay times is determined so that the vehicle height vibrations on the front-wheel side and rear-wheel side are converged toward the mean vehicle height from the same converging direction and are suppressed to zero at the mean vehicle height at almost the same time.

It is possible to obtain the above-mentioned relationship for each type of the vehicle body M3 by means of running experiments. That is, appropriate delay times related to either the front wheels M1 or the rear wheels M2 are selected depending on vehicle speeds so that good ride comfort can be obtained and vehicle height vibrations can be suppressed to zero in the early stage thereof. Then appropriate delay times related to the other delay times of the front wheels M1 and the rear wheels M2 are selected for each of the combinations of the vehicle speeds and the appropriate delay times by experiments so that the vehicle height vibrations on the front-wheel and rear-wheel sides are converged toward the mean vehicle height from the same direction at almost the same time. Thereby, a map 80 showing the relationship between the delay times and the vehicle speeds is obtained. The damping force control means M9 refers to such a map and selects the first and second delay times having individually appropriate values based on the current vehicle speed.

Figure 2:
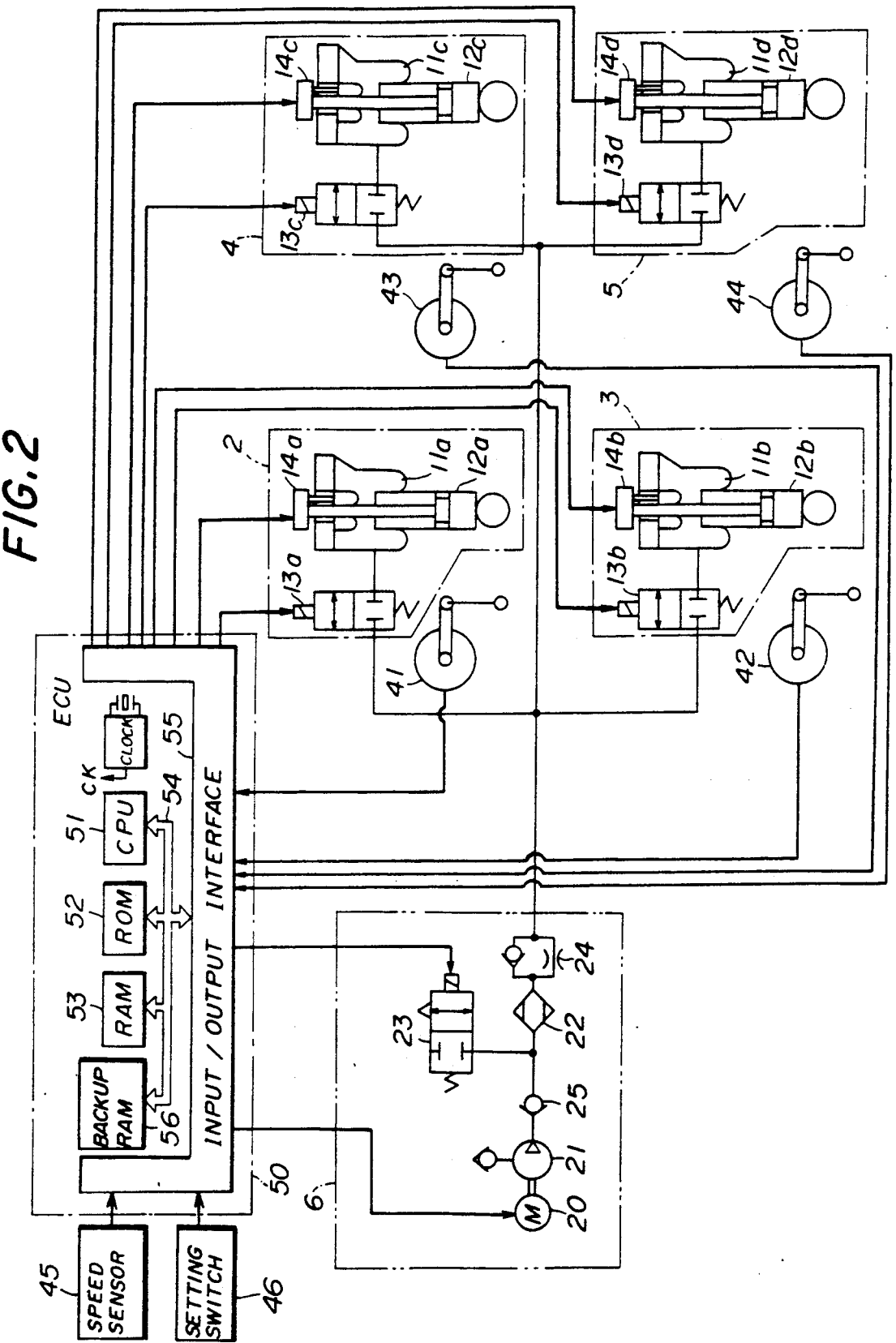
FIG. 2 is a system diagram of a preferred embodiment of the present invention.

A description will now be given of the vehicle height (body) vibration control apparatus according to a preferred embodiment of the present invention. Referring to FIG. 2, there is illustrated a vehicle having the vehicle body vibration control apparatus according to the preferred embodiment of the present invention. Air suspensions 2, 3, 4 and 5 are respectively provided between a vehicle body and left and right front wheels and left and right rear wheels. Since each of the air suspensions 2, 3, 4 and 5 has the same structure, only the air suspension 2 provided between the vehicle body and the right front wheel will be described in detail for the sake of convenience.

The air suspension 2 includes a variable spring constant type air chamber 11a and a variable damping force type shock absorber 12a. The air chamber 11a functions to change the vehicle height. Further, the air suspension 2 includes a vehicle height control valve 13a and an air suspension actuator 14a. The vehicle height control valve 13a, which is a 2-port and 2-position electromagnetic valve of a spring off-set type, normally interrupts the passage of compressed air from a compressed air feed and discharge system 6, and connects the air passage when adjusting the vehicle height. The air suspension actuator 14a functions to alter the magnitude (level) of the damping force of the shock absorber 12a as well a the value of the spring constant of the air chamber 12a. The air suspensions 2, 3, 4 and 5 are further described in U.S. Pat. No. 4,744,589, the disclosure of which is hereby incorporated by reference.

The compressed air feed and discharge system 6 includes a motor 20, a compressor 21, an air drier 22, an air solenoid valve 23 and check valves 24 and 25. The motor 20 drives the compressor 21 to generate compressed air necessary to increase the vehicle height. The air drier 22 functions to dry the compressed air from the compressor 21 via the check valve 25. The air solenoid valve 23 discharges air from the air chambers 11a, 11b, 11c and 11d when decreasing the vehicle height. During adjustment of the vehicle height, the air solenoid valve 23 is controlled so that it is maintained in a closed state or an open state. When the air solenoid value 23 is closed and the vehicle height control valves 13a, 13b, 13c and 13d are opened, the compressed air from the compressor 21 is fed to the vehicle height control valves 13a, 13b, 13c and 13d so that the vehicle height is increased. On the other hand, when the air solenoid value 23 is opened and the vehicle height control valves 13a, 13b, 13c and 13d are opened, the compressed air in the air chambers 11a, 11b, 11c and 11d is discharged therefrom so that the vehicle height is decreased.

Figure 3A:
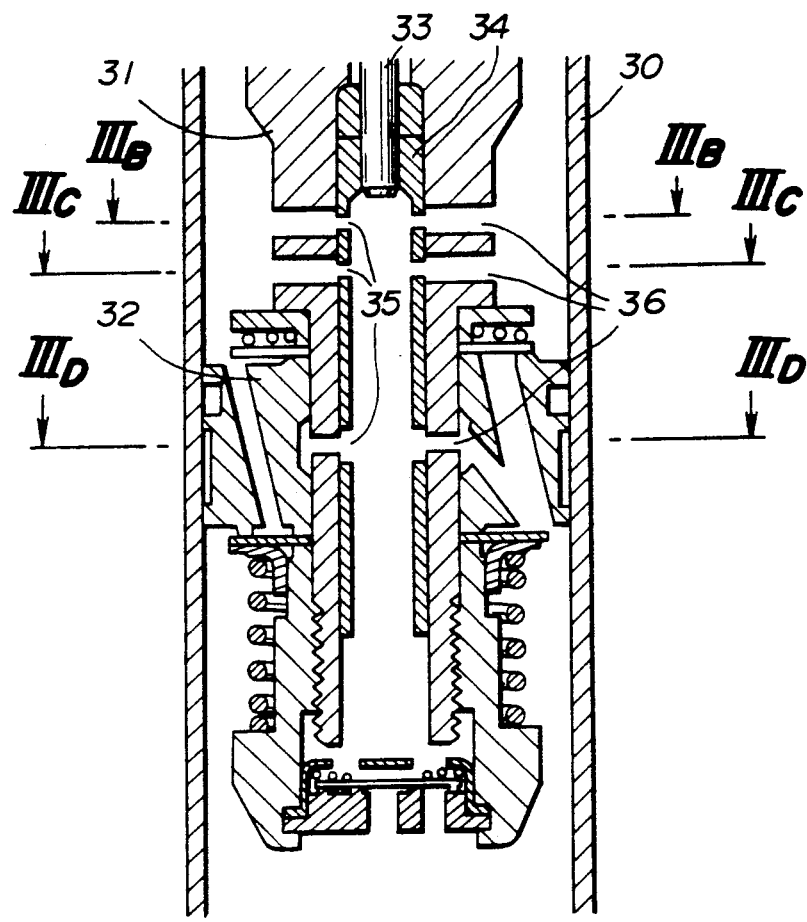
FIG. 3A is a vertical sectional view of a shock absorber used in the embodiment of the present invention shown in FIG. 2.
Figures 3B, 3C, 3D:
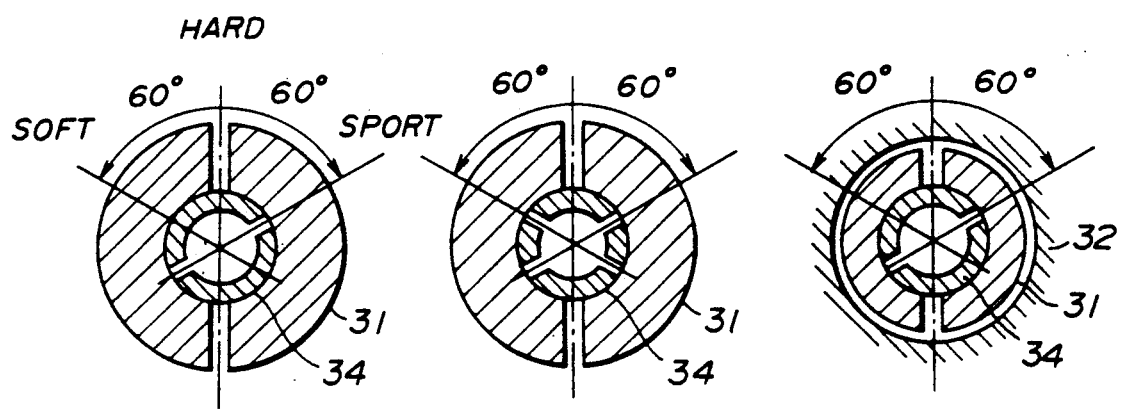
FIG. 3B is a diagram taken along line $III_B$—$III_B$ shown in FIG. 3A.
FIG. 3C is a diagram taken along line $III_C$—$III_C$.
FIG. 3D is a diagram taken along line $III_D$—$III_D$.

The shock absorber 12a will be described below with reference to FIGS. 3A through 3D. FIGS. 3B, 3C and 3D are diagrams respectively taken along lines III$_B$—III$_B$, III$_C$—III$_C$ and III$_D$—III$_D$ shown in FIG. 3A. Each of the shock absorbers 12b, 12c and 12d has the same structure as the shock absorber 12a. Referring to FIG. 3A, the shock absorber 12a includes a piston rod 31 provided inside an outer cylinder 30 and a piston 32 which is slidably fitted in an inner wall of the outer cylinder 30. Inside the piston rod 31 is movably provided a control rod 33, which is driven by the air suspension actuator 14a (FIG. 2). A rotary valve 34 integrated with the control rod 33 is provided inside the piston rod 31. The rotary valve 34 is provided with three orifices 35, and the piston rod 31 is provided with three orifices 36. The air suspension actuator 14a rotates the control rod 33 so that the orifices 35 and 36 are opened or closed and the amount of oil passing therethrough is adjusted. By means of the adjustment of the damping force of the shock absorber 12a, it is possible to set the suspension characteristic to either SOFT state, SPORT state or HARD state. When the damping force is adjusted so as to be at a low level, the suspension characteristic is set to SOFT state. When the damping force is adjusted so as to be at a high level, the suspension characteristic is set to HARD state. The SPORT state is an intermediate state between SOFT state and HARD state.

The air suspension actuator 14a includes a direct current motor (not shown), the rotation force of which is transferred to the control rod 33 of the shock absorber 12a via a gear engaging with a shaft of the direct current motor. This arrangement is disclosed in U.S. Pat. No. 4,756,549, the disclosure of which is hereby incorporated by reference. When the direct current motor is rotated in a normal or reverse direction under the control of an electronic control unit 50 (which will be described in detail later), the control rod 33 rotates in the normal or reverse direction so that the aforementioned orifices 35 and 36 are opened or closed. Thus, the damping forces of the shock absorbers 12a, 12b, 12c and 12d are altered.

The vehicle shown in FIG. 2 includes conventional vehicle height sensors 41, 42, 43 and 44 and a vehicle speed sensor 45. Each of the vehicle height sensors 41, 42, 43 and 44 is provided between the vehicle body and a corresponding one of the four wheels, and outputs a detection signal representative of a vehicle height corresponding to a gap between the vehicle body and a corresponding suspension arm (stabilizer) which moves in response to a vertical movement of the wheel. The vehicle speed sensor 45 detects the speed of the vehicle. The vehicle height setting switch 46 is used for inputting a target vehicle height data such as a threshold value.

The output signals from the sensors 41–45 are input to the electronic control unit (hereafter simply referred to as an ECU) 50. On the other hand, the ECU 50 drives the motor 20, and the air solenoid valves 13a, 13b, 13c and 13d to control the vehicle height. Further, the ECU 50 drives the air suspension actuators 14a, 14b, 14c and 14d so that the damping force of each shock absorber (corresponding to suspension characteristic) is selectively set to either the low level, high level or intermediate level and the spring constant is selectively changed to either a small value, a large value or an intermediate value.

The ECU 50 includes a central processing unit (hereafter simply referred to as a CPU) 51, a read only memory (hereafter simply referred to as a ROM) 52 and a random access memory (hereafter simply referred to as a RAM) 53, all of which are connected to each other through a common bus 54 connected to an input/output interface circuit 55. The ROM 52 stores a program of the control procedure shown in FIGS. 4A, 4B and 5 and the map 80 shown in FIG. 6. The RAM 53 temporarily stores various data. The signals from the aforementioned sensors 41 through 45 are input to the CPU 51 through the input/output interface circuit 55. On the other hand, the CPU 51 outputs control signals to the aforementioned actuators and valves through the input/output interface circuit 55. The ECU 50 also includes a backup RAM 56 for storing a variety of data. The ECU 50 operates in accordance with a clock signal CK generated by a clock generator provided in the ECU 50.

It will be noted that the structural elements shown in FIG. 2 correspond to those shown in FIG. 1 as follows. The vehicle height sensors 41 and 42 correspond to the vehicle height detecting means M4, and the vehicle height sensors 43 and 44 correspond to the vehicle height detecting means M5. The speed sensor 45 corresponds to the vehicle speed measuring means M6. The shock absorbers 12a and 12b and the air suspension actuators 14a and 14b correspond to the vehicle height vibration damping mechanism M7. The shock absorbers 12c and 12d and the air suspension actuators 14c and 14d correspond to the vehicle height vibration damping mechanism M8. The ECU 50 corresponds to the damping force control means M9 and the delay time setting means M10.

A description will now be given of the vehicle height (body) vibration control process according to the first embodiment of the present invention with reference to FIGS. 4A, 4B, 5, 6 and 7. The control process shown in FIGS. 4A and 4B is repeatedly carried out for separate control of the front wheels and separate control of the rear wheels. The following description mainly relates to the control of the vehicle height vibration damping mechanism M7 provided for the front wheels M1 (FIG. 1).

The control process commences to calculate the current vehicle speed from an output value of the speed sensor 45 (step 110). At step 120, the map 80 shown in FIG. 6 is referred to and damping force alteration parameters K1 (mm) and K2 (mm) having values depending on the current vehicle speed V (km/h) are input to the CPU 51. The alteration parameters K1 and K2 are related to the separate vehicle height vibration controls on the front-wheel side and the rear-wheel side, respectively. The parameters K1 and K2 are used for determining whether or not the damping force should be increased. At step 130, the CPU 51 determines whether or not the current damping force is at the low level. For example, the CPU 51 controls flags related to the predetermined low, intermediate and high levels of the damping force and refers to the flags at step 130.

When the damping force is maintained at the low level, the CPU 51 determines, at step 140, whether or not an absolute value $|D1|$ of a relative vehicle height displacement obtained from the output values from the vehicle sensors 41 and 42 related to the front wheels has become greater than the alteration parameter K2.

Figure 5:
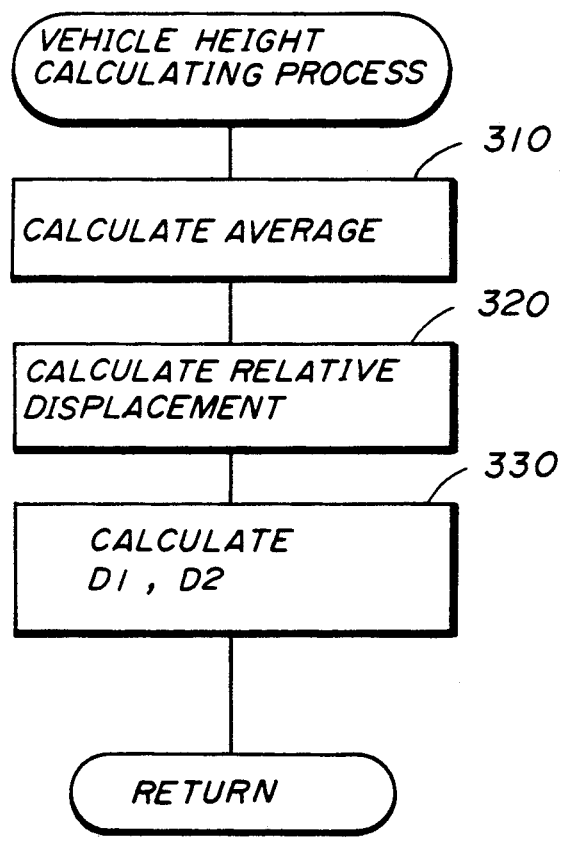
FIG. 5 is a flowchart of a vehicle height calculating process executed by the preferred embodiment of the present invention shown in FIG. 2.

The relative vehicle height displacement is always renewed at a predetermined interval by a vehicle height calculating process shown in FIG. 5. That is, at step 310, the CPU 51 calculates an average of a predetermined number of output values from each of the vehicle height sensors 41, 42, 43 and 44. At step 320, the CPU 51 subtracts current output values (displacement values) of the vehicle height sensors 41, 42, 43 and 44 from the corresponding averages so that the relative vehicle height displacements on the side of the four wheels are individually obtained. At step 330, the CPU 51 calculates an average value D1 of the relative vehicle height displacements related to the front wheels and an average value D2 of the relative vehicle height displacements related to the rear wheels.

Turning to FIG. 4A, at step 150, the CPU 51 determines whether or not the absolute value $|D!1|$ has become greater than the alteration parameter K1 when it is determined, at step 140, that the absolute value $|D1|$ is equal to or less than the alteration parameter K2. When the determination result obtained at step 150 is NO, the control process ends. Thereafter, the control process shown in FIGS. 4A, 4B and 5 is repeatedly executed at the predetermined intervals. During the control process, each time it is determined, at step 150, that $|D1|>K1$, the CPU 51 determines the vehicle height vibration to be negligibly small so that the damping force is maintained at the low level.

A case is considered where at least one of the front wheels rides over an obstacle or a projection on a road surface so that the absolute value $|D1|$ exceeds the alteration parameter K2. In this case, the determination result obtained at step 140 is affirmative. Thus, the control process proceeds to step 160, at which step the CPU 51 inputs the value of the delay time K3 which is related to the front wheels and the current vehicle speed V from the map 80 shown in FIG. 6. At step 170, the CPU 51 determines whether or not the delay time K3 has elapsed from the time when it is determined at step 140, that $|D1|>K2$. The damping force related to the front wheels is maintained at the low level until the delay time K3 elapses. When the vehicle speed is equal to 60 km/h, for example, the value of the delay time K3 related to the front wheels is set to $c_2$ ms.

When the determination result at step 170 becomes affirmative, the control process proceeds to step 180, at which step the CPU 51 refers to the map 80 shown in FIG. 6 and inputs an actuating time during which the damping force of each of the shock absorbers 12a and 12b related to the front wheels is maintained at the high level. When the delay time K3 is set to $c_2$, the actuating time is set to $d_2$ ms, during which time the air suspension actuators 14a and 14b are driven so that the damping force of each of the shock absorbers 12a and 12b is maintained at the high level (step 190). After the damping force of each of the shock absorbers 12a and 12b is set to the high level, the control process is terminated at once. Even when the control process is terminated, the damping force of each of the shock absorbers 12a and 12b is maintained at the high level during the delay time K3.

The damping force of each of the shock absorbers 12c and 21d provided for the rear wheels is controlled by the control process shown in FIGS. 4A, 4B and 5, as in the case of the shock absorbers 12a and 12b. When the absolute value $|D1|$ has become greater than K2 (at step 140), at step 160, the CPU 51 refers to the map 80 shown in FIG. 6 and sets the delay time K3 to $c_5$ (60 km/h).

Figure 7:
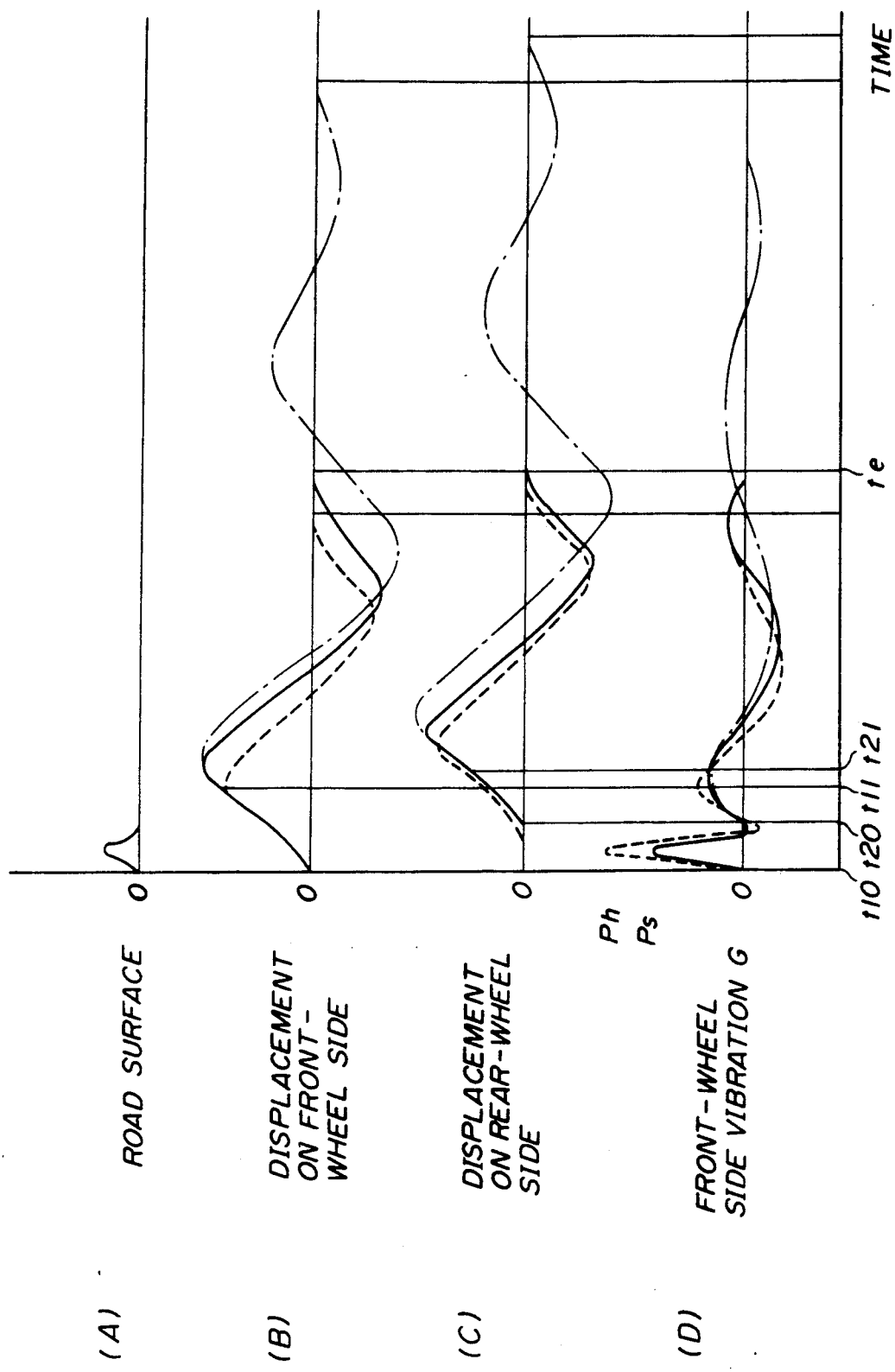
FIG. 7 is a timing chart showing how to control the damping force of the shock absorbers according to the preferred embodiment of the present invention shown in FIG. 2.

Referring to FIG. 7, a case is considered where at least one of the front wheels rides over an obstacle or a projection (FIG. 7(A)) on the road surface at time $t_{10}$. The damping force of each of the shock absorbers 12a and 12b for the front wheels is maintained at the low level until the delay time K3 elapses (until time $t_{11}$). Thus, the relative vehicle height displacement changes, as shown by the solid line in FIG. 7(B). The damping force of each of the shock absorbers 12a and 12b is altered to the high level at time $t_{11}$, and is maintained during the actuating time $d_2$ ms. In the illustrated case, the vehicle height vibration is suppressed to zero at time $t_e$.

On the other hand, one of the rear wheels or both ride over the obstacle or projection at time $t_{20}$. The damping force of each of the rear wheels is maintained at the low level until the delay time K3 (its value is less than that for the front wheels) elapses (until time $t_{21}$). At time $t_{21}$, the damping force of each of the shock absorbers 12c and 12d is altered to the high level and is then maintained during the actuating time $d_5$ ms. As shown in FIG. 7 (A) and FIG. 7(B), the vehicle height vibration on the rear-wheel side is decreased to zero at almost the same time as the vehicle height vibration on the front-wheel side is decreased to zero (time $t_e$). In addition, the relative vehicle height displacement on the rear-wheel side is converged toward the mean vehicle height (where the relative vehicle displacement is zero) from the minus side in the same way as the relative vehicle height displacement on the front-wheel side. That is, the relative vehicle height displacements on the front-wheel and rear-wheel sides are converged toward the mean vehicle height from the same converging direction (minus side of the displacement). Thus, the vehicle height vibration is suppressed to zero so that the vehicle body is increasing and stopped. The damping forces of the shock absorbers 12a, 12b, 12c and 12d are controlled so that the vehicle height displacement on the front-wheel side is suppressed to zero along the same converging direction at almost the same time. Thus, it is possible to improve ride comfort.

The map 80 shown in FIG. 6 can be obtained by running experiments. First, parameters K1, K2, K4 and K5 (K4 and K5 are hold parameters, which will be described later) and the actuating time are individually set to certain values. Next, the values of the delay time K3 related to the rear wheels for various vehicle speeds V are determined so that a shock due to a rough road surface is buffered and the vehicle height displacement is decreased to zero within the first one-cycle thereof. Then, experiments are carried out using combinations of the vehicle speeds, the various values of the delay time K3 for the rear wheels and the other parameters. In the experiments, the vehicle height vibration on the front-wheel side is compared with the vehicle height vibration on the rear-wheel side for each of the different values of the delay time K3. Finally, specific values of the delay time K3 related to the front wheels are selected, these values enabling the vehicle height vibration on the front-wheel side to be suppressed to zero from the same converging direction at almost the same time as the vehicle height vibration on the rear-wheel side. Thereby, the map 80 shown in FIG. 6 is obtained. If necessary, the values of the parameters K1, K2, K4 and K5 and the actuating time are adjusted.

The relationships among the values shown in FIG. 6 are as follows. However, the present invention is not limited to the values shown in FIG. 6.

$$a_2 < e_1 < a_1 = b_1 = f_1$$
$$a_2 = a_3, e_1 = e_2 = e_3 = e_4 = e_5 = e_6$$
$$a_1 = a_4 = a_5 = a_6,$$
$$b_1 = b_2 = b_3 = b_4 = b_5 = b_6$$
$$f_1 = f_2 = f_3 = f_4 = f_5 = f_6$$
$$c_1 > c_2 > c_3 > c_4 = c_5 = c_6$$
$$d_1 = g_1 > d_4 = g_4$$
$$d_1 = d_2 = d_3, d_4 = d_5 = d_6$$
$$g_1 = g_2 = g_3, g_4 = g_5 = g_6$$

The following conditions will be seen from the above values. The value of the alteration parameter K1 related to the front wheels decreases with an increase in the vehicle speed. The value of the alteration parameter K1 related to the rear wheels is constant irrespective of the vehicle speed. The value of the alteration parameter K2 is fixed irrespective of the vehicle speed. The value of the parameter K3 related to the front wheels decreases with an increase of the vehicle speed. The value of the parameter K3 related to the rear wheels is constant irrespective of the vehicle speed. The value of the parameter K3 related to the front wheels is always greater than that related to the rear wheels. The value of the actuating time related to the front wheels is constant irrespective of the vehicle speed. The value of the actuating time related to the rear wheels is constant irrespective of the vehicle speed. Alternatively, it is possible depending on the vehicle speed to change the value of the alteration parameter K1 related to the rear wheels and/or the value of the alteration parameter K2. It is also possible to vary the actuating time, depending on the vehicle speed.

Turning now to FIG. 4A, the determination result obtained at step 130 is negative during the time K3 ($=d_2$ ms in the aforementioned example) after the damping force is altered to the high level. At step 200, the CPU 51 inputs, from the map 80 shown in FIG. 6, the values of the hold parameters K4 and K5 which are related to the front wheels and correspond on the current vehicle speed V. The hold parameters K4 and K5 are used for determining whether the damping force should be continuously maintained or decreased. When the current vehicle speed V is equal to 60 km/h for example, $K4=e_2$ mm and $K5=f_2$ mm. At step 210, the CPU 51 determines whether or not the absolute value $|D1|$ is greater than the hold parameter K5. When the determination result at step 210 is YES, steps 180 and 190 for altering the damping force to the high level are successively executed again. Thereby, the damping force of each of the shock absorbers 12a and 12b provided for the front (rear) wheels is continuously maintained at the high level during the actuating time $g_2$ ms after the elapse of the actuating time $d_2$ ms. That is, the time during which the damping force is continuously maintained at the high level is lengthened when an abnormal vehicle height displacement satisfying $|DA|>K5$ takes place or the vehicle is continuously running on a continuously rough road.

When it is determined, at step 220, that $|D1|>K4$ (that is, $K5 > |D!| \geq K4$), the CPU 51 inputs the actuating time related to the current vehicle speed V (step 230). At step 240, the CPU 51 controls the shock absorbers 12a and 12b provided for the front wheels so that the damping force thereof is maintained at the intermediate level during the actuating time which is input at step 230. When the determination results obtained at steps 210 and 220 are both negative, the control process is ended at once.

A description will now be given of a case where K2 $|D1|>K1$. In this case, the determination result obtained at step 140 is NO, and the determination result obtained at step 150 is YES. Then steps 250 and 260 (FIG. 4B) are executed. Steps 250 and 260 are the same as steps 160 and 170. Thus, the damping force of each of the shock absorbers 12a and 12b is maintained at the low level during the delay time K3. After that, if $|D1|>K2$ (step 270), it is determined that the vehicle height vibration is increasing and thus the damping force is set to the high level (step 180). When $K2 \geq |D1|$ even after the elapse of the delay time K3, the damping force is set to the intermediate level by the execution of steps 230 and 240.

In the same manner, the shock absorbers 12c and 12d provided for the rear wheels are controlled when $K2 \geq |D1| > K1$. It will be noted that the damping force is not set to the intermediate level at the first control routine. After that, if the determination result obtained at step 220 is affirmative, the damping force is set to the intermediate level at step 230.

As has been described above, the value of the delay time K3 used for altering the damping force of each of the shock absorbers 12a and 12b provided for the front wheels to the high level is determined separately from the value of the delay time K3 used for altering the damping force of each of the shock absorbers 12c and 12d provided for the rear wheels. The values of the delay time K3 are determined by running experiments so that the vehicle height displacement on the front-wheel side is converged toward zero along the same converging direction at almost the same time as that on the rear-wheel side. Thus, it is possible to improve ride comfort. With the above-mentioned arrangement, a person in the vehicle body will feel that the vehicle height vibration is a bouncing vibration.

The embodiment of the present invention described above selects the value of the delay time K3 between the time when it is necessary to alter the damping force to the high level and the time when the damping force is actually altered to the high level, depending on the vehicle speed V. In addition to this control, it is possible to change the spring constant of each of the air chambers 11a and 11b (FIG. 2) to a high level at the same time as the damping force related to the front wheels is altered to the high level and to change the spring constant of each of the air chambers 11c and 11d to a high level at the same time as the damping force related to the rear wheels is altered to the high level. With this arrangement, it becomes possible to reduce the cycles of vehicle height vibrations on the front-wheel and rear-wheel sides. Thus, the damping force is altered to the high level at an earlier time. As a result, the delay time K3 can be set to a smaller value so that the vehicle height vibration can be suppressed to zero more rapidly.

Alternatively, it is possible to use a spring constant related to the front wheels which is different from a spring constant related to the rear wheels. Thereby, the difference between the vibration cycles obtained on the front-wheel and rear-wheel sides is increased so that the delay time K3 can be selected from a wider range of possible values and thus the degree of freedom in design can be increased. Appropriate values of the spring constant can be determined by running experiments. It is also possible to use different values of the spring constant for different vehicle speeds V. The vehicle height vibration is decreased with an increase in the spring constant so that a person in the vehicle body is given a much more comfortable ride. The arrangement where the vibration is decreased to zero within the first one-cycle thereof provides the least uncomfortable ride.

In the experiments for obtaining the map 80 shown in FIG. 6, it is determined that vehicle height vibrations are suppressed when they have become less than a predetermined vehicle height range (for example, when K1 > |D1| is satisfied). This is due to the fact that in actuality, there are always slight vibrations when the vehicle is running. A vehicle height sensor outputs zero when the vehicle height has become less than a predetermined value. In a case where each of the vehicle height sensors 41-44 is formed of such a sensor, it is possible to determine that the vehicle height vibrations are suppressed when the output of each of the sensors 41-44 has become zero.

The present invention is not limited to the specifically described embodiments, and variations and modifications may be made without departing from the scope of the present invention.

What is claimed is:

1. A vehicle body vibration control apparatus for controlling a first mechanism for suppressing a front-wheel-side vehicle height vibration on a front-wheel side of a vehicle by a first damping force and a second mechanism for suppressing a rear-wheel-side vehicle height vibration on a rear-wheel side thereof by a second damping force, said vehicle body vibration control apparatus comprising:

vehicle height detecting means for detecting a first vehicle height on the front-wheel side and a second vehicle height on the rear-wheel side;

vehicle speed measuring means for measuring a vehicle speed of said vehicle;

damping force control means, coupled to said first and second mechanisms and said vehicle height detecting means, for controlling said first damping force so that said first damping force is increased after a first delay time elapses from a time when said first vehicle height exceeds a first predetermined vehicle height range and for controlling said second damping force so that said second damping force is increased after a second delay time elapses from a time when said second vehicle height exceeds a second predetermined vehicle height range; and delay time setting means, coupled to said vehicle speed measuring means and said damping force control means, for setting said first and second delay times which vary depending on said vehicle speed in said damping force control means, so that said front-wheel-side vehicle height vibration and said rear-wheel-side vehicle height vibration are converged toward a mean vehicle height from an identical converging direction and are suppressed to said mean vehicle height at almost the same time.

2. A vehicle body vibration control apparatus as claimed in claim 1, wherein said delay time setting means comprises:

map means for storing values of said first and second delay times for predetermined vehicle speed ranges; and read means for reading out from said map means a corresponding one of the values of said first delay time related to a corresponding one of said vehicle speed ranges in which said vehicle speed measured by said vehicle speed measuring means is included and for reading out from said map means a corresponding one of the values of said second delay time related to said corresponding one of the vehicle speed ranges, said corresponding one of the values of said first delay time and said corresponding one of the values of said second delay time read out from said map means being supplied to said damping force control means.

3. A vehicle body vibration control apparatus as claimed in claim 1, wherein said second delay time is less than said first delay time for an identical vehicle speed.

4. A vehicle body vibration control apparatus as claimed in claim 1, wherein said delay time setting means sets said first delay time in said damping force control means so that said first delay time increases with a decrease of said vehicle speed.

5. A vehicle body vibration control apparatus as claimed in claim 1, wherein said damping force control means damps said front-wheel-side vehicle height vibration within a fist one-cycle thereof and damps said rearwheel-side vehicle height vibration within a first one-cycle thereof.

6. A vehicle body vibration control apparatus as claimed in claim 1, wherein said damping force control means comprises hold means for maintaining said first damping force at a first increased level during a first actuating time after said first damping force is altered to said first increased level and for maintaining said second damping force at a second increased level during a second actuating time after said second damping force is altered to said second increased level.

7. A vehicle body vibration control apparatus as claimed in claim 6, further comprising actuating time setting means for setting said first and second actuating times so that said first and second actuating times vary depending on said vehicle speed measured by said vehicle speed measuring means.

8. A vehicle body vibration control apparatus as claimed in claim 6, wherein said first actuating time is constant irrespective of the vehicle speed.

9. A vehicle body vibration control apparatus as claimed in claim 6, wherein said second actuating time is constant irrespective of the vehicle speed.

10. A vehicle body vibration control apparatus as claimed in claim 1, wherein said damping force control means comprises:
first determining means for determining whether or not said first vehicle height exceeds a first predetermined value defining said first predetermined vehicle height range; and
second determining means for determining whether or not said second vehicle height exceeds a second predetermined value defining said second predetermined vehicle height range.

11. A vehicle body vibration control apparatus as claimed in claim 10, further comprising adjusting means for adjusting said first and second predetermined values on the basis of the vehicle speed measured by said vehicle speed measuring control means.

12. A vehicle body vibration control apparatus as claimed in claim 10, wherein said first predetermined value is constant irrespective of the vehicle speed.

13. A vehicle body vibration control apparatus as claimed in claim 10, wherein said second predetermined value is constant irrespective of the vehicle speed.

14. A vehicle body vibration control apparatus as claimed in claim 1, wherein:
said first predetermined vehicle height range has a first vehicle height section and a second vehicle height section having a vehicle height greater than a vehicle height within said first vehicle height section;
said damping force control means comprises determining means for determining whether said vehicle height measured by said first vehicle height detecting means is within said first vehicle height section or said second vehicle height section;
said first damping force is set to a first increased level when said determining means determines said first vehicle height is within said first vehicle height section; and
said first damping force is set to a second increased level greater than said first increased level when said determining means determines that said first vehicle height is within said second vehicle height range.

15. A vehicle body vibration control apparatus as claimed in claim 1, wherein:
said second predetermined vehicle height range has a first vehicle height section and a second vehicle height section having a vehicle height greater than a vehicle height within said first vehicle height section;
said damping force control means comprises determining means for determining whether said vehicle height measured by said second vehicle height detecting means is within said first vehicle height section or said second vehicle height section;
said second damping force is set to a first increased level when said determining means determines said second vehicle height is within said first vehicle height; and
said second damping force is set to a second increased level greater than said first increased level when said determining means determines that said second vehicle height is within said second vehicle height range.

16. A vehicle body vibration control apparatus as claimed in claim 14, further comprising adjusting means for adjusting said first predetermined vehicle height section, depending on said vehicle speed measured by said vehicle speed measuring means.

17. A vehicle body vibration control apparatus as claimed in claim 15, wherein said first and second predetermined vehicle height sections are constant irrespective of said vehicle speed measured by said vehicle speed measuring means.

18. A vehicle body vibration control apparatus as claimed in claim 1, wherein said first vehicle height is an average of variations in a vehicle height on the front-wheel side for a predetermined period, and said second vehicle height is an average of variations in a vehicle height on the rear-wheel side for said predetermined period.

19. A vehicle body vibration control apparatus as claimed in claim 1, wherein:
said damping force control means comprises two suspensions provided on the front-wheel side and two suspensions provided on the rear-wheel side;
each of said suspensions has a variable spring constant; and
said vehicle body vibration control apparatus comprises spring constant control means, coupled to said damping force control means, for controlling said two suspensions provided on the front-wheel side so that the variable spring constants thereof are increased at the same time as said first damping force is increased and for controlling said two suspensions provided on the rear-wheel side so that the variable spring constants thereof are increased at the same time as said second damping force is increased.

20. A vehicle body vibration control apparatus as claimed in claim 19, wherein each of said suspensions is an air suspension.

* * * * *